United States Patent [19]
Mouri et al.

[11] 3,820,094
[45] June 25, 1974

[54] DISPLACEMENT-ELECTRIC SIGNAL CONVERTER

[75] Inventors: Mineju Mouri; Katsuhiko Aoki, both of Kasasaki, Japan

[73] Assignee: Fuji Electric Company Limited, Kanagawa, Japan

[22] Filed: Apr. 11, 1973

[21] Appl. No.: 350,254

[30] Foreign Application Priority Data
Apr. 11, 1972 Japan.............................. 47-36333
Aug. 3, 1972 Japan.............................. 47-78218

[52] U.S. Cl................................ 340/199, 340/196
[51] Int. Cl............................................. G08c 19/08
[58] Field of Search....................... 340/199, 196

[56] References Cited
UNITED STATES PATENTS
3,178,696  4/1965  Claflin ............................. 340/199
3,341,834  9/1967  Bogue............................... 340/199
3,502,966  3/1970  Perets ............................... 340/196

Primary Examiner—Thomas B. Habecker
Attorney, Agent, or Firm—Sughrue, Rothwell, Mion, Zinn & Macpeak

[57] ABSTRACT

A displacement-electric signal converter comprises two annular magnetic bodies disposed concentrically, a magnetizing coil placed in an air gap formed between the two annular magnetic bodies, a short-circuiting ring freely rotatably provided on one of the two annular magnetic bodies, and at least one detecting coil provided on one of the two annular magnetic bodies for detecting magnetic fluxes flowing the interior of the annular magnetic body, an a.c. voltage being supplied to the magnetizing coil, the short-circuiting ring being rotated corresponding to a displacement to be measured, whereby an electric signal corresponding to the displacement to be measured can be obtained from the detecting coil.

6 Claims, 13 Drawing Figures

DISPLACEMENT-ELECTRIC SIGNAL CONVERTER

BACKGROUND OF THE INVENTION

This invention relates to a displacement-electric signal converter which can convert an angular displacement in a wide range into an electric signal.

Known in the art is a displacement-electric signal converter comprising a detecting coil wound around an annular magnetic body throughout the entire circumference thereof thereby forming a stator, the winding direction of one half of the detecting coil being opposite to the winding direction of the other half of the detecting coil, and a bar magnet having an exciting coil wound on the bar magnet thereby forming a rotor disposed internally of the stator, said exciting coil being energized from an a.c. voltage source, said rotor being rotated in accordance with an angular displacement to be measured, whereby an electric signal corresponding to the angular displacement can be obtained from the detecting coil.

However, such a displacement-electric signal converter has entailed drawbacks in that an angular displacement exceeding 180° cannot be theoretically converted into an electric signal and that the detecting coil must be wound around entire circumference of the magnetic body very accurately if a converter of ordinary precision is desired to be realized.

SUMMARY OF THE INVENTION

Therefore, a primary object of the present invention is to provide an improved displacement-electric signal converter wherein all of the above described drawbacks of the conventional converter can be substantially eliminated.

Another object of the invention is to provide an improved displacement-electric signal converter which is simple in construction and economical in manufacture.

Still another object of the invention is to provide an improved displacement-electric signal converter wherein an angular displacement variable in a range of 360° can be theoretically converted into an electric signal.

An additional object of the invention is to provide an improved displacement-electric signal converter wherein no precision winding is required along the entire magnetic body.

The above described and other objects of the present invention can be achieved by an improved displacement-electric signal converter which comprises two annular magnetic bodies disposed coaxially with each other, a magnetizing coil disposed in an air gap formed between the two annular magnetic bodies, the magnetizing coil being energized from an a.c. power source, a short-circuiting ring provided on one of the two annular magnetic bodies, and at least one detecting element provided for detecting magnetic fluxes passing through one of the two annular magnetic bodies, said short-circuiting ring or both of said magnetizing coil and detecting element being rotated in accordance with an angular displacement to be measured, whereby an output electric signal is obtained from the detecting element.

The nature, principle, and utility of the present invention can be more clearly understood from the following detailed description of the invention when read in conjunction with the accompanying drawings wherein like parts are designated by like reference numerals.

DETAILED DESCRIPTION OF THE INVENTION

Figure 1A:
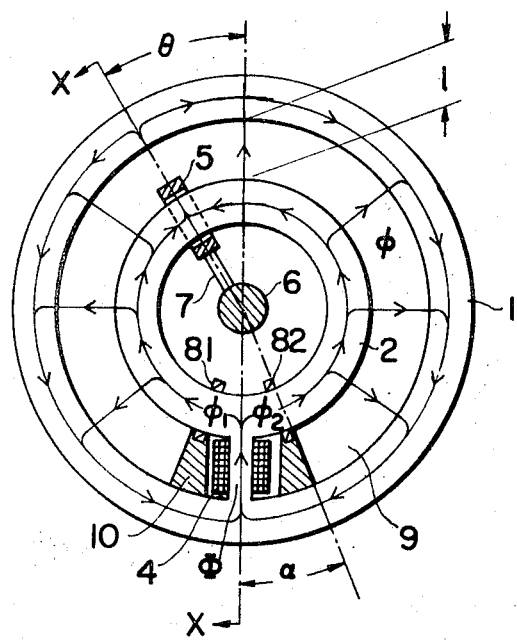
FIGS. 1 and 2 show different examples of displacement-electric signal converters according to the present invention wherein one of the two annular magnetic bodies is disposed inside of the other, and those designated by (A) are plan views of the examples and the others designated by (B) are elevational views, partly in section, taken along the lines X—X in the plan views.
Figure 1B:
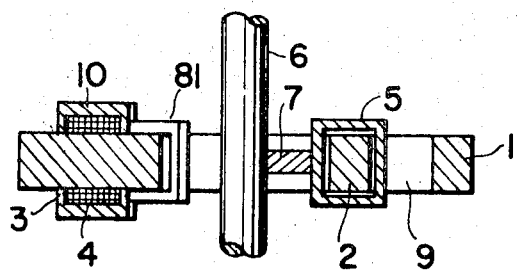

Referring now to FIG. 1, there are indicated two annular magnetic bodies 1 and 2 concentrically disposed with one designated by 2 included inside of the other designated by 1. At the center, a rotatable shaft 6 is disposed so that it is rotated in accordance with an angular displacement to be measured. The two annular magnetic bodies 1 and 2 may be constructed by, for instance, laminated core plates, a ferrite core, or a dust core made of a powdered magnetic material solidified by a synthetic resin. The two annular magnetic bodies 1 and 2 are connected together by means of a yoke 3 on which a magnetizing coil 4 is wound. The number of turns of the magnetizing coil 4 is $N_1$ (T). An a.c. power source is connected to the magnetizing coil 4. Furthermore, the magnetizing coil 4 is covered by a shielding plate 10, and when the magnetizing coil 4 is energized by the a.c. power source, a magnetic circuit comprising the magnetizing coil 4, the two annular magnetic bodies 1 and 2, and an air gap 9 formed between the two annular magnetic bodies 1 and 2 is thereby established. On the annular magnetic body 2, two detecting coils 81 and 82 are wound at positions adjacent to both ends of the magnetizing coil 4. The numbers of turns of the two detecting coils 81 and 82 are equal to $N_2$ (T), and the two detecting coils 81 and 82 are connected together to be operable differentially. On the annular magnetic body 2, a short-circuiting ring 5 connected through an arm 7 to the rotatable shaft 6 is provided so that the short-circuiting ring 5 can be moved along the circumference of the magnetic body 2 in a sliding manner. Thus, when the shaft 6 is rotated corresponding to an annular displacement to be measured, the short-circuiting ring 5 is moved along the circumference of the magnetic body 2. The rotatable shaft 6 and the arm 7 are made of a non-magnetic substance.

The operating principle of the displacement-electric signal converter shown in FIG. 1 will now be described in detail.

Assuming that an a.c. voltage $E_1$ (V) is applied to the magnetizing coil 4, and a magnetizing current $I_1$ (A) is passed through the magnetizing coil 4. Then, magnetic fluxes $\Phi$ (wb) as shown in the following equation (1) are created in the magnetic circuit.

$$\Phi = N_1 I_1 / R \tag{1}$$

wherein, R represents a magnetic reluctance determined by the reluctances in the magnetizing coil, annular magnetic bodies 1 and 2, and the air gap 9 formed between the magnetic bodies 1 and 2. In this embodiment, the direction of the magnetic fluxes $\Phi$ is directed from the magnetic body 2 to the magnetic body 1 in the air gap 9, and is directed from the magnetic body 1 to the magnetic body 2 in the yoke 3.

Thus, it will be apparent that uniform distribution of the magnetic fluxes in the air gap 9 can be obtained under the following conditions (1) and (2).

1. The magnetic bodies 1 and 2 are of uniform quality having a specific magnetic permeability $\mu_s$ of extremely high value.
2. The radial length $l(m)$ of the air gap 9 formed between the two annular magnetic bodies 1 and 2 is constant throughout the circumference, and the cross-sectional areas of the annular magnetic bodies 1 and 2 are equal with each other and also uniform throughout the entire circle.

In the case where the specific permeability $\mu_s$ of the two annular magnetic bodies 1 and 2 is extremely high, the magnetic reluctances of the annular magnetic bodies 1 and 2 can be neglected against that for the air gap 9. Thus, the magnetic reluctance R in the equation (1) is substantially determined by that in the air gap 9.

When the annular magnetic bodies 1 and 2 are arranged concentrically around the rotatable shaft 7, the radial length becomes constant throughout the circumference and the cross-sectional areas of the magnetic bodies are also made constant throughout the entire circles. As a result, the magnetic reluctance in radial direction of the air gap 9 becomes constant throughout the entire 360° angle thereby realizing uniform magnetic flux distribution in the air gap 9.

Furthermore, assuming that an angular range $2\alpha$ is occupied by the shielding plate 10 and leakage fluxes within the shielding plate 10 is negligible, magnetic fluxes $\phi$ (wb/rad) per unit angle in the air gap 9 can be expressed as follows because of the uniform distribution of the magnetic fluxes.

$$\phi = \Phi/2(\pi - \alpha) \tag{2}$$

When it is further assumed that the magnetic fluxes $\phi_1$ interlink the detecting coil 81 and the magnetic fluxes $\phi_2$ interlink the detecting coil 82, the magnetic fluxes $\phi_1$ and $\phi_2$ passing through the annular magnetic body 2 constantly leak out of the magnetic body 2 at a rate of $\phi$ per unit angle until the magnetic fluxes become zero at the position of the short-circuiting ring 5. Assuming that the rotating angle of the short-circuiting ring 5 measured from the line X—X is $\theta$, the magnetic fluxes $\phi_1$ and $\phi_2$ which are flowing in the opposite directions can be expressed as follows.

$$\phi_1 = (\pi - \alpha - \theta)\phi \tag{3}$$

$$\phi_2 = (\pi - \alpha + \theta)\phi \tag{4}$$

Since the detecting coils 81 and 82 are wound oppositely and the numbers of turns thereof are equal to $N_2$ (T), the resultant magnetic fluxes $\phi_0$ interlinking with the detecting coils 81 and 82 can be expressed as $$\phi_0 = \phi_2 - \phi_1 = 2\theta\phi \tag{5}$$

and an induced voltage $E_2$ (V) in the detecting coils 81 and 82 can be expressed as $$E_2 = N_2 \cdot (d\phi_0/dt) \tag{6}$$

The equation (6) can be transformed into (7) by the use of equations (1) and (5).

$$E_2 = [\theta/(\pi - \alpha)] \cdot N_2 \cdot (d\Phi/dt) \tag{7}$$

Assuming that the entire magnetic fluxes $\Phi$ are interlinked with the magnetizing coil 4, following equation (8) is satisfied.

$$N_1 \Phi = L I_1 \tag{8}$$

wherein L is the self-inductance of the magnetizing coil 4.

When a relation as (9) is satisfied between the reactance $\omega L$ (ohms) and the resistance $r$ (ohms) of magnetizing coil 4, a following relation (10) is established between the magnetizing voltage $E_1$ and the magnetizing current $I_1$.

$$\omega L \gg r \tag{9}$$

$$E_1 = L(dI_1/dt) \tag{10}$$

Accordingly, the equation (7) can be converted into equation (11) based on the equations (8) and (10).

$$E_2 = [\theta/(\pi - \alpha)] \cdot (N_2/N_1) \cdot E_1 = K\theta \tag{11}$$

wherein $K = [E_1/(\pi-\alpha)] \cdot (N_2/N_1)$ = a constant

From the equation (11) it is apparent that an a.c. voltage $E_2$ proportional to the rotating angle $\theta$ of the rotatable shaft 6 can be obtained from the detecting coils 81 and 82 connected together.

Now each of the detecting coils 81 and 82 are considered in more detail.

An induced voltage $E_{21}$ (V) in the detecting coil 81 is expressed as in the following equation (12) based on the equation (3).

$$E_{21} = K_1 - K_2\theta \tag{12}$$

wherein, $K_1 = (E_1/2)\cdot(N_2/N_1)$, $K_2 = (E_1/2)\cdot(N_2/N_1)\cdot[1/(\pi - \alpha)]$ Likewise, an induced voltage $E_{22}$ (V) in the detecting coil 82 can be expressed as $$E_{22} = K_1 + K_2\theta \qquad (13)$$

From the equations (12) and (13), it will be apparent that if the term $K_1$ can be compensated, a voltage proportional to an angular displacement to be measured can be obtained from either one of the detecting coils 81 and 82. In that case, another detecting coil can be omitted.

Figure 2A:
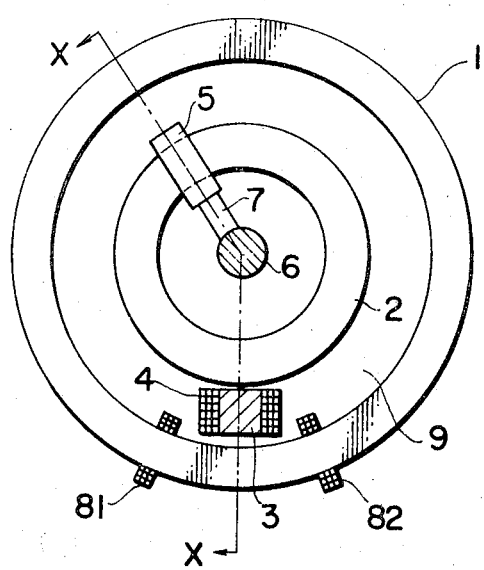
Figure 2B:
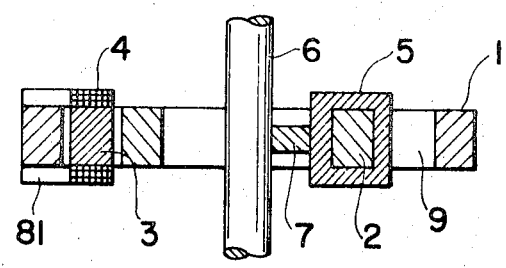

In FIG. 2, there is indicated another embodiment of the present invention wherein two annular magnetic bodies 1 and 2 are disposed independently without being coupled together through a yoke as in the case of FIG. 1, and a magnetizing coil 4 is wound around a yoke 3 disposed in an air gap between the two annular magnetic bodies 1 and 2 in a floating manner. A short-circuiting ring 5 is placed around the magnetic body 2 and is coupled mechanically through an arm 7 to a rotatable shaft 6. By this construction, the short-circuiting ring 5 and the annular magnetic body 2 are integrally rotated together with the rotatable shaft 6 in accordance with an angular displacement to be measured, and an output electrical signal is obtained from the detecting coil or coils which are wound on the annular magnetic body 1.

Figure 3A:
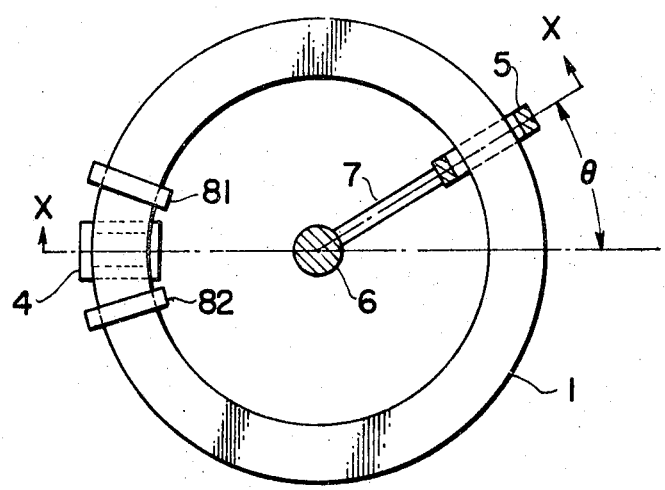
FIGS. 3, 5, and 6 show different examples of the displacement-electric signal converters according to the present invention wherein two annular magnetic bodies are disposed in an up-and-down relation, and those designated by (A) are plan views of the examples and the others designated by (B) are elevational views, partly in section, taken along the lines X—X in the plan views.
Figure 3B:
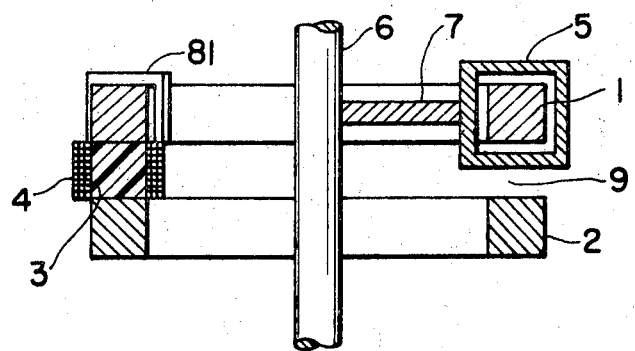

In still another embodiment shown in FIG. 3, the annular magnetic bodies 1 and 2 are disposed in such a manner that the axes thereof are substantially in parallel and the magnetic bodies 1 and 2 are thereby placed in an overlying relation. The magnetic bodies are made of, for instance, laminated core plates, ferrite, or the like as in the embodiment shown in FIG. 1, and the sizes of which are made equal. The two annular magnetic bodies 1 and 2 are rigidly coupled through a yoke 3 placed in the air gap 9, and a magnetizing coil 4 is wound around the yoke 3. Two detecting coils 81 and 82 are wound around the magnetic body 1. The operational principle of this embodiment is equvalent with that shown in FIG. 1.

Figure 4A:
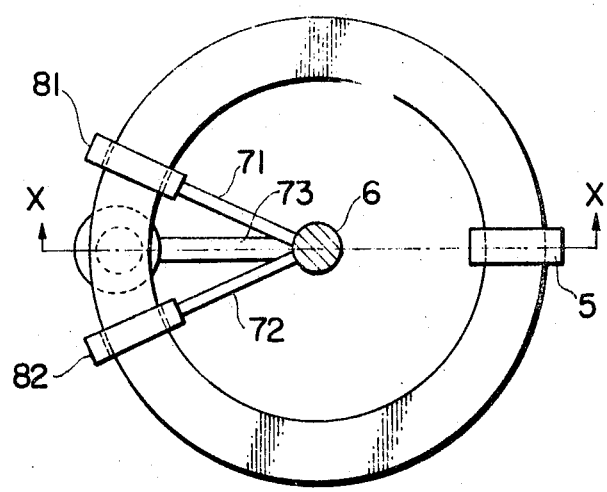
FIG. 4 shows an example similar to those indicated in FIGS. 3, 5, and 6, and (A) is a plan view, (B) is an elevational view partly in section, taken along the line X—X in FIG. 5, and (C) is a sectional view of an important part of the example.
Figure 4B:
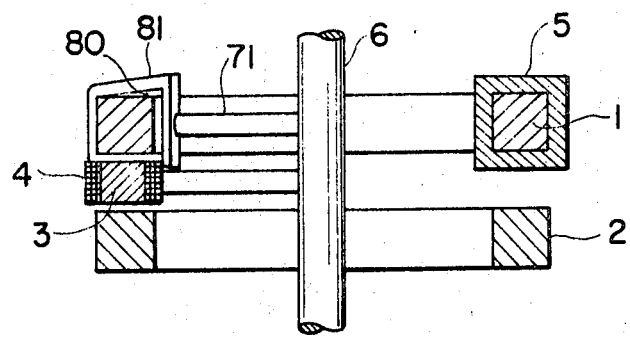
Figure 4C:
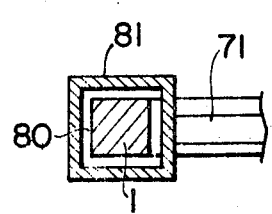

In FIG. 4, there is indicated still another embodiment of the present invention, wherein the short-circuiting ring 5 is fixed to the annular magnetic body 1. Detecting coils 81 and 82 are wound around the annular magnetic body 1 maintaining gaps 80 therebetween so that the detecting coils 81 and 82 can be freely rotated relative to the magnetic body 1. The detecting coils 81 and 82 are further mechanically coupled to the rotatable shaft 6 through arms 71 and 72, respectively. The yoke 3 is provided in the air gap 9 independent from the magnetic bodies, and on the yoke 3, a magnetizing coil 4 is wound. The magnetizing coil 4 is also mechanically coupled to the rotatable shaft 6 through an arm 73. As a result, the detecting coils 81 and 82 and the magnetizing coil 4 are integrally rotated together with the rotatable shaft 6 along the periphery of the annular magnetic body 1.

Figure 5A:
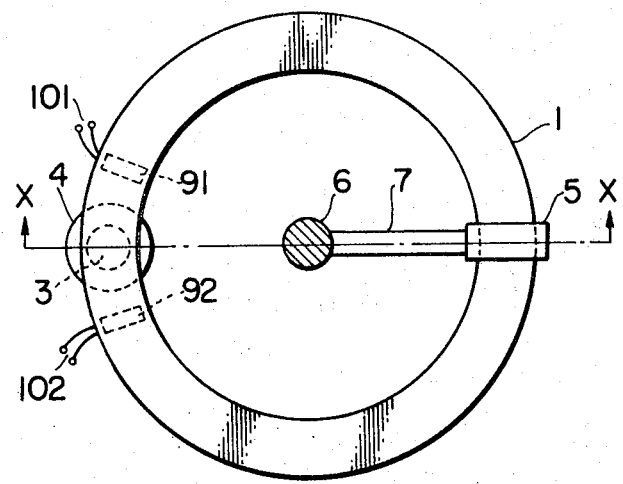
Figure 5B:
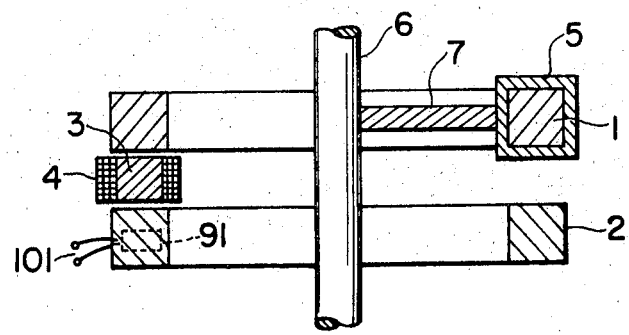

In FIG. 5, there is indicated still another embodiment of the invention wherein the two annular magnetic bodies 1 and 2 are not rigidly coupled through the yoke 3. The short-circuiting ring 5 is fixed to the magnetic body 1 so that the magnetic body 1 and the fixed short-circuiting ring 5 are integrally rotated together with the rotatable shaft 6. As detecting means for the magnetic fluxes in the magnetic body 2, magneto-electric transducers such as magneto-resistance elements 91 and 92 are buried inside of the magnetic body 2 at positions interposed by the magnetizing coil 4. The magneto-resistance elements 91 and 92 are connected respectively to leads 101 and 102. Electro-magnetic operational principle of this embodiment is quite same as in the embodiment shown in FIG. 1. However, in this embodiment, any variation in the magnetic fluxes in the magnetic body 2 is read out as a variation in the resistance value of the magneto-resistance elements 91 and 92. Accordingly, any angular displacement of the rotatable shaft 7 is detected from a variation in the resistance values of the magneto-resistance elements. Furthermore, instead of the magneto-resistance elements 91 and 92, Hall elements may also be employed for detecting the variation of the magnetic fluxes.

Figure 6A:
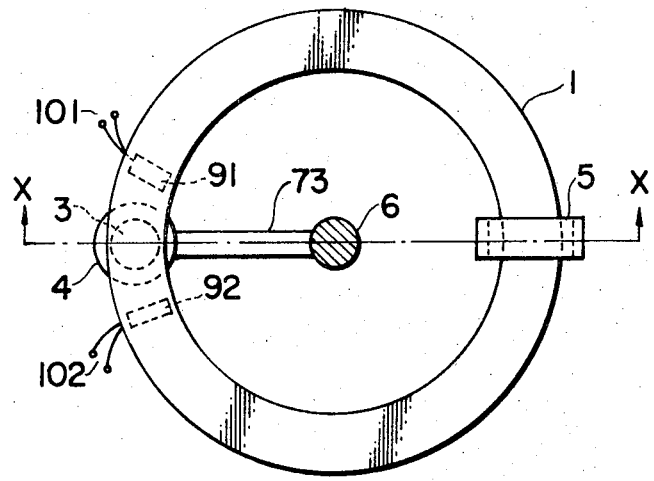
Figure 6B:
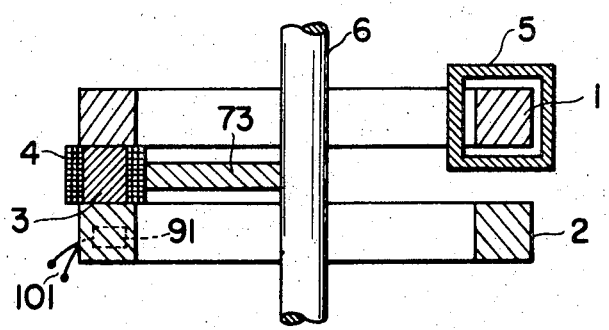

A further embodiment of the invention as shown in FIG. 6 comprises a short-circuiting ring 5 loosely mounted on the annular magnetic body 1, and a yoke 3 mechanically coupling the two annular magnetic bodies 1 and 2. The yoke 3 is further coupled with the rotatable shaft 6 through an arm 73. magneto-resistance elements 91 and 92 are buried in the annular magnetic body 2 at positions interposed by the magnetizing coil 4. Accordingly, the annular magnetic bodies 1 and 2, magnetizing coil 4, yoke 3, and the magneto-resistance elements are all integrally rotated together with the rotatable shaft 6.

In the above descriptions, specific permeability $\mu_s$ of the annular magnetic bodies 1 and 2 is assumed to be a far greater value and a uniform distribution of magnetic fluxes in the air gap 9 is obtained by coaxially arranging the annular magnetic bodies 1 and 2. However, if it is impossible to obtain such a great specific permeability of the annular magnetic bodies 1 and 2, magnetic reluctances of the magnetic bodies 1 and 2 can not be neglected in comparison with the reluctance of the air gap 9. In that case, the distribution of magnetic fluxes in the air gap 9 can be made substantially uniform by slightly displaceing the axes of the annular magnetic bodies 1 and 2 against each other in parallel manner.

According to this invention, any angular displacement in the entire 360° range can be theoretically converted into electric signal without requiring a precision winding along the entire length of the magnetic body as was the case of the conventional device, whereby the production of the displacement-electric signal converter can be substantially facilitated.

We claim:

1. A displacement-electric signal converter comprising two annular magnetic bodies disposed substantially coaxially around a rotatable shaft, a yoke having a shielding plate provided in an air gap formed between said two annular magnetic bodies, a magnetizing coil wound around said yoke to be connected with an a. c. power source, at least one detecting element for detecting magnetic fluxes passing through one of said two annular magnetic bodies, and a short-circuiting ring interlinked with one part of one of said two annular magnetic bodies and coupled through an arm to said rotatable shaft, said short-circuiting ring being rotated in correspondence with a displacement to be measured, whereby an output electric signal is obtained from said detecting element.

2. A displacement-electric signal converter as set forth in claim 1 wherein said two annular magnetic bodies having different diameters, and are arranged substantially concentrically in a horizontal plane around said rotatable shaft centrally located thereto.

3. A displacement-electric signal converter as set forth in claim 1 wherein said two annular magnetic bodies having the same diameter, and are arranged substantially coaxially around said rotatable shaft in an overlying manner.

4. A displacement-electric signal converter comprising two annular magnetic bodies disposed substantially coaxially around a rotatable shaft, a yoke having a shielding plate provided in an air gap formed between said two annular magnetic bodies, a magnetizing coil wound around said yoke to be connected with an a. c. power source, at least one detecting element for detecting magnetic fluxes passing through one of said two annular magnetic bodies, and a short-circuiting ring interlinked with one part of one of said two annular magnetic bodies, said magnetizing coil and said detecting element being coupled to said rotatable shaft through an arm and rotated in correspondence with a displacement to be measured, whereby an output electric signal is obtained from said detecting element.

5. A displacement-electric signal converter as set forth in claim 4 wherein said two annular magnetic bodies having different diameters, and are arranged substantially concentrically in a horizontal plane around said rotatable shaft centrally located.

6. A displacement-electric signal converter as set forth in claim 4 wherein said two annular magnetic bodies having the same diameter, and are arranged substantially coaxially around said rotatable shaft in an overlying manner.

* * * * *